(12) United States Patent
Leube et al.

(10) Patent No.: US 12,471,772 B2
(45) Date of Patent: Nov. 18, 2025

(54) DETERMINING A REFRACTIVE ERROR OF AN EYE

(71) Applicant: Carl Zeiss Vision International GmbH, Aalen (DE)

(72) Inventors: Alexander Leube, Aalen (DE); Arne Ohlendorf, Tübingen (DE); Siegfried Wahl, Donzdorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 738 days.

(21) Appl. No.: 17/507,852

(22) Filed: Oct. 22, 2021

(65) Prior Publication Data

US 2022/0039645 A1 Feb. 10, 2022

Related U.S. Application Data

(63) Continuation of application No. PCT/EP2020/061208, filed on Apr. 22, 2020.

(30) Foreign Application Priority Data

Apr. 23, 2019 (EP) .................................. 19170561

(51) Int. Cl.
*A61B 3/032* (2006.01)
*A61B 3/00* (2006.01)
(Continued)

(52) U.S. Cl.
CPC ............ *A61B 3/032* (2013.01); *A61B 3/0041* (2013.01); *A61B 3/113* (2013.01); *A61B 3/14* (2013.01)

(58) Field of Classification Search
CPC .................. A61B 3/022; A61B 3/032
(Continued)

(56) References Cited

U.S. PATENT DOCUMENTS 5,675,399 A * 10/1997 Kohayakawa ......... A61B 3/032
351/222
6,402,320 B1 6/2002 Borchert
(Continued)

FOREIGN PATENT DOCUMENTS

BR 0114568 A 1/2004
BR 102014004108 B1 3/2022
(Continued)

OTHER PUBLICATIONS

David A. Atchison, Russell L. Woods, and Arthur Bradley, "Predicting the effects of optical defocus on human contrast sensitivity," J Opt. Soc. Am. A 15, 2536-2544 (1998) (Year: 1998).*
(Continued)

*Primary Examiner* — Zachary W Wilkes
(74) *Attorney, Agent, or Firm* — Tautz & Schuhmacher LLC; Georg Hasselmann

(57) ABSTRACT

A method, a device, and a computer program for determining a refractive error of at least one eye of a user are disclosed, as well as a method for producing a spectacles lens for the user. The method includes: displaying at least one symbol on a screen, wherein at least one parameter of the symbol displayed on the screen is changed; detecting eye movement metrics of the eye of the user according to the symbol displayed on the screen; establishing a point in time at which a recognition threshold of the user is revealed for the symbol displayed on the screen from the eye movement metrics of the eye of the user; and determining a value for the refractive error of the eye of the user from the at least one parameter established at the point in time.

13 Claims, 2 Drawing Sheets

(51) Int. Cl.
*A61B 3/113* (2006.01)
*A61B 3/14* (2006.01)

(58) Field of Classification Search
USPC .......................................... 351/222, 242, 223
See application file for complete search history.

(56) References Cited

U.S. PATENT DOCUMENTS

| | | | |
|---|---|---|---|
| 6,511,180 B2 | 1/2003 | Guirao et al. | |
| 6,899,428 B2* | 5/2005 | Mihashi | A61B 3/1015 351/239 |
| 7,824,033 B2 | 11/2010 | Lai | |
| 7,918,558 B1* | 4/2011 | Legerton | A61B 3/113 351/246 |
| 7,926,948 B2* | 4/2011 | Holladay | A61B 3/036 351/239 |
| 8,152,301 B2 | 4/2012 | Fisher et al. | |
| 8,382,286 B2* | 2/2013 | Legerton | A61B 3/113 351/221 |
| 10,827,922 B2* | 11/2020 | Hu | A61B 3/113 |
| 11,122,999 B2* | 9/2021 | Hill | A61B 5/486 |
| 11,129,526 B2 | 9/2021 | Ohlendorf et al. | |
| 11,583,178 B2* | 2/2023 | Prusky | A61B 3/113 |
| 12,042,227 B2* | 7/2024 | Mooney | G09G 5/20 |
| 2003/0147048 A1* | 8/2003 | Mihashi | A61B 3/06 351/211 |
| 2008/0186450 A1* | 8/2008 | Holladay | A61B 3/036 351/239 |
| 2012/0019779 A1* | 1/2012 | Legerton | A61B 3/113 351/209 |
| 2012/0287398 A1 | 11/2012 | Baker et al. | |
| 2013/0176534 A1 | 7/2013 | Frankfort et al. | |
| 2014/0268060 A1 | 9/2014 | Lee et al. | |
| 2015/0070273 A1 | 3/2015 | He et al. | |
| 2017/0150882 A1* | 6/2017 | Lindig | A61B 3/005 |
| 2019/0320962 A1* | 10/2019 | Hill | A61B 5/7405 |
| 2020/0121179 A1* | 4/2020 | Prusky | A61B 3/032 |
| 2020/0121184 A1* | 4/2020 | Hu | A61B 5/4863 |
| 2022/0039646 A1 | 2/2022 | Ohlendorf et al. | |
| 2024/0164636 A1* | 5/2024 | Mooney | A61B 5/163 |

FOREIGN PATENT DOCUMENTS

| | | |
|---|---|---|
| EP | 1948002 A1 | 7/2008 |
| EP | 3730036 A1 | 10/2020 |
| EP | 3730918 A1 | 10/2020 |
| EP | 3730919 A1 | 10/2020 |
| EP | 3730998 A1 | 10/2020 |
| WO | 2018077690 A1 | 5/2018 |

OTHER PUBLICATIONS

Blignaut "Mapping the Pupil-Glint Vector to Gaze Coordinates in a Simple Video-Based Eye Tracker," Journal of Eye Movement Research 7(1):4, pp. 1 to 11, 1995.

Thibos et al. "Power Vectors: An Application of Fourier Analysis to the Description and Statistical Analysis of Refractive Error," Optometry and Vision Science 74 (6), pp. 367 to 375, 1997.

Industrial Norm "Ophthalmic optics—Spectacle lenses—Vocabulary (ISO 13666:2012)," German and English version EN ISO 13666:2012, Oct. 2013.

Denniss et al. "Estimation of Contrast Sensitivity From Fixational Eye Movements," Investigative Ophthalmology & Visual Science, 59 (13), pp. 5408 to 5416, 2018.

Written Opinion issued in PCT/EP2020/061208, to which this application claims priority, completed Jun. 26, 2020.

International Search Report issued in PCT/EP2020/061208, to which this application claims priority, mailed Jul. 6, 2020, and English-language translation thereof.

Blendowske "Unaided Visual Acuity and Blur: A Simple Model," Optom. Vis. Sci. 92, pp. 121 to 125, 2015.

Artal (Ed.) "Ametropia," Section 19.4 of the Handbook of Visual Optics, vol. 1, CRC Press, 2017.

Kolb et al. "Visual Acuity," Webvision—The Organization of the Retina and Visual System, University of Utah Health Sciences Center, 2018.

Rucci et al.: "Miniature eye movements enhance fine spatial detail," Nature, 447 (7146), 852, 2007.

Industrial Norm DIN 58220-5:2013-09: "Sehschärfebestimmung [Visual acuity testing]," DIN-Normenausschuss Feinmechanik und Optik (NAFuO), Apr. 2021 (in German and English).

Leube et al.: "Individual neural transfer function affects the prediction of subjective depth of focus," Scientific Reports 3(1), 1919, 2018.

Office Action by the Brazilian Patent Office issued in BR112021021061-0, which is a counterpart hereof, mailed on Jul. 8, 2025, and English-language machine translation thereof.

* cited by examiner

DETERMINING A REFRACTIVE ERROR OF AN EYE

CROSS REFERENCE TO RELATED APPLICATIONS

This application is a continuation application of international patent application PCT/EP2020/061208, filed Apr. 22, 2020, designating the United States and claiming priority from European patent application EP 19170561.5, filed Apr. 23, 2019, and the entire content of both applications is incorporated herein by reference.

TECHNICAL FIELD

The present disclosure relates to a method, an apparatus, and a computer program for determining a refractive error of at least one eye of a user, and to a method for producing a spectacle lens for at least one eye of the user.

BACKGROUND

The related art has disclosed methods for determining refractive errors of an eye of a user. Here, the term "refraction" denotes a refraction of light in the eye of the user which is experienced by a light beam incident in the interior of the eye through the pupil. Defocusing of the eye of the user, i.e., a specific refractive error, can lead to a refraction error (ametropia) of the user, in particular to nearsightedness (myopia) or farsightedness (hyperopia) of the user. For the subjective determination of the refraction, optotypes, typically in the form of numerals, letters, or symbols, are usually provided on a board or a visual display unit with a defined size for a given distance and are observed by the user. By having available a number of optical lenses with known properties and by guiding the user through a questionnaire process, it is possible to subjectively determine the defocusing of the eye of the user and to determine which, e.g., spherocylindrical configuration of the spectacle lens leads to a substantial compensation of the refractive error of the eye and hence to an image quality for the user that is as optimal as possible.

Furthermore, known methods for objectively determining the refraction of the eye require the optical measuring appliance configured to this end and the light source required to this end to be aligned with the optical axis of the eye. Therefore, known apparatuses for objectively determining the refraction can usually only be operated by specialists, in particular by opticians, and are generally stationary and therefore unable to be used in a mobile setting.

U.S. 2012/0019779 A1 discloses a method for capturing visual functions, comprising a stimulation of an optokinetic nystagmus by presenting a visual stimulus to a user; varying a first parameter of the visual stimulus; varying a second parameter of the visual stimulus; and using the varied visual stimulus to determine a threshold stimulus for the optokinetic nystagmus, wherein the first and the second parameter are selected from a group of parameters comprising a pattern for the visual stimulus, a width of the visual stimulus, a distance between the visual stimulus and the patient, a spatial frequency of the visual stimulus, a rate of change or temporal frequency of the test surface of the visual stimulus, and a contrast between elements of the visual stimulus.

U.S. 2013/0176534 A1 discloses a method for adaptively determining a model for the visual performance of a user, wherein the user is subjected to a multiplicity of tests. Each test comprises identifying a stimulating pattern, generating the pattern on a display, determining whether the pattern generates an optokinetic nystagmus, updating the model in order to include the results from the examination of the optokinetic nystagmus, and determining whether the updated model is acceptable. The tests can be repeated iteratively until the model for the visual performance of the user is acceptable.

U.S. 2014/0268060 A1 discloses an apparatus and a method for determining the refraction of an eye and an astigmatism using a computer visual display unit. To this end, an optotype is displayed on the visual display unit and a value for the size of the optotype at which the optotype is just no longer identifiable by the user is established by varying the size of the optotype displayed on the visual display unit.

U.S. Pat. No. 8,152,301 B2 discloses a method for testing the vision of a person. To this end, the person needs to identify a target symbol in one or more sequences of test images and actuate an activation controller. A parameter value which, in turn, can be assigned to a vision metric is obtained by processing activation information.

WO 2018/077690 A1 discloses apparatuses and a computer program that can be used to determine the spherocylindrical refraction of an eye. To this end, a component with an adjustable optical unit is provided, the latter being able to be adjusted in respect of its refractive power by way of a refractive power setting device. Then, the spherocylindrical refraction is determined from the setting of the refractive power setting device in different orientations of a typical direction of the optical unit or a typical direction of optotypes.

Furthermore, methods and apparatuses for determining eye movements of a user are known.

U.S. Pat. No. 6,402,320 B1 discloses an automatic method for determining a visual acuity, in particular for infants, by means of an electronic visual display device, said method comprising the following method steps: (a) providing a fixation target on the display device as a stimulus for the user; then (b) providing a test image on the display device, wherein the test image comprises at least two separate fields, with one of the fields having a first test pattern and another one of the fields having a control pattern, wherein the test pattern is configured to be a stimulus for the user once the test pattern is recognizable by the user; then (c) detecting whether an eye movement toward the test pattern occurs, a presence of an eye movement toward the test pattern confirming the discernability of the first test pattern by the user; and (d) repeating steps (b) and (c) with a further test pattern, with the further test pattern being more difficult to discern than the first test pattern; and (e) determining the visual acuity of the user from the occurrence or absence of the eye movement toward the first test pattern and to at least one further test pattern.

Rucci, M., Iovin, R, Poletti, M., & Santini, F. (2007), *Miniature eye movements enhance fine spatial detail*, Nature, 447 (7146), 852 report an analysis of the influence of fixational eye movements on a discrimination of gratings masked by noise that has a power spectrum similar to that of natural images. By means of a method for stabilizing the retinal image it was possible to selectively eliminate the motion of the retinal image which occurs between successive jumps of eye movements (which are known as saccades) for capturing a new fixation point. This publication indicated that fixational eye movements improve discrimination of high spatial frequency stimuli, but not of low spatial frequency stimuli. This improvement originates from temporal modulations introduced by fixational eye movements in the visual input to the retina, which emphasize the high spatial frequency stimuli. In natural vision dominated by low spatial frequency stimuli, fixational eye movements appear to represent an effective strategy for processing of spatial detail.

U.S. 2015/0070273 A1 discloses methods and apparatuses for optical detection and tracking of an eye movement. A method for tracking the eye movement comprises emitting light toward the eye of the user using a plurality of light sources substantially equally spaced from a photodetector module of the apparatus, receiving at the photodetector module at least a partial retroreflection of the light emitted by each of the plurality of light sources retroreflected from the eye, and determining a positional parameter of the eye on the basis of different values of the at least partial retroreflection of the light in relation to the plurality of light sources.

Denniss, J., Scholes, C., McGraw, P. V., Nam, S. H., & Roach, N. W. (2018), *Estimation of Contrast Sensitivity From Fixational Eye Movements*, Investigative Ophthalmology & Visual Science, 59 (13), pp. 5408-16, describe a method for objectively and reliably estimating a contrast sensitivity from the observation of microsaccades. Results obtained therefrom indicate that the rate of microsaccades likewise increases with increasing contrast in an image.

SUMMARY

It is an object of the present disclosure to provide a method, an apparatus, and a computer program for determining a refractive error of at least one eye of a user, and a method for producing a spectacle lens for at least one eye of the user, which at least partly overcome the presented disadvantages and limitations of the related art.

In particular, the method, the apparatus, and the computer program should facilitate the determination of the refractive error of the at least one eye without having to resort to a subjective reaction of the user. In this case, the refractive error of the at least one eye of the user should be determined without specialist equipment and should therefore also be able to be carried out by non-specialists.

This object is achieved by a method, an apparatus, and a computer program for determining a refractive error of at least one eye of a user, and by a method for producing a spectacle lens for at least one eye of the user, wherein an eye movement of the user is captured. Exemplary embodiments, which can be realized individually or in combination, are presented below.

Hereinafter the terms "exhibit," "have," "comprise," or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B," "A has B," "A comprises B," or "A includes B" can refer both to the situation in which no further element aside from B is provided in A, that is to say to a situation in which A consists exclusively of B, and to the situation in which, in addition to B, one or more further elements are provided in A, for example element C, elements C and D, or even further elements.

In a first aspect, the present disclosure relates to a method for determining a refractive error of at least one eye of a user. In this case, the method can relate to determining the refractive error of one eye or of both eyes of a user. The method comprises the following steps a) to d), typically in the stated sequence. Another sequence is also possible in principle. In particular, the steps could also be performed entirely or partially at the same time. It is furthermore possible for individual, multiple, or all steps of the method to be performed repeatedly, in particular more than once. In addition to the stated steps, the method can also comprise further method steps.

The method for determining a refractive error of at least one eye of a user comprises the steps of:

a) representing at least one symbol on a visual display unit, wherein at least one parameter of the at least one symbol represented on the visual display unit is varied;

b) capturing an eye movement metric of at least one eye of the user on the basis of the at least one symbol represented on the visual display unit;

c) establishing a point in time at which a recognition threshold of the user for the at least one symbol represented on the visual display unit is evident from the eye movement metric of the at least one eye of the user; and d) determining a value for the refractive error of the at least one eye of the user from the parameter defined at the point in time.

The method proposed herein for determining a refractive error of at least one eye of a user is suitable, in particular, for use in a method for producing a spectacle lens for the at least one eye of the relevant user. Pursuant to the standard DIN EN ISO 13666:2013-10, also referred to as the "standard" below, sections 8.1.1 and 8.1.2, a "spectacle lens" is understood to mean an ophthalmic lens which, within the scope of the present disclosure, should serve to correct a refractive error of the eye, with the ophthalmic lens being worn in front of the eye of the user but not in contact with the eye.

In the context of the present disclosure, the term "spectacles" denotes any element which comprises two individual spectacle lenses and a spectacle frame, the spectacle lens being provided for insertion into a spectacle frame that is selected by a user of the spectacles. Instead of the term "wearer" used here, one of the terms "subject," "spectacle wearer," "user," or "subject" can also be used synonymously.

According to step a) of the present method there is a representation of at least one symbol on a visual display unit, wherein at least one parameter of the at least one symbol represented on the visual display unit is varied. Here, the term "visual display unit" denotes any electronically controllable display with a two-dimensional extent, with the respectively desired symbol being representable with largely freely selectable parameters at any location within the extent. In this case, the visual display unit can typically be selected from a monitor, a screen or a display. In this case, the visual display unit can typically be contained in a mobile communications device. In this case, the term "mobile communications device" encompasses in particular a cellular phone (cellphone), a smartphone, or a tablet. However, other types of mobile communications devices are conceivable. In this way, the present method for determining a refractive error of the at least one eye can be carried out at any desired location. However, other types of visual display units are likewise possible.

In this case, the term "symbol" relates to at least one optotype, in particular, letters, numbers or signs; at least one image or at least one pattern, each of which can be represented in color or in black and white. While the "optotype" is an individual fixed symbol in each case, which is only able to be varied to a restricted extent in its proportions for recognition by the user, the term "pattern" denotes any graphical structure which—in particular in contrast to noise which remains without identifiable structure—has at least one spatially oriented period, within which the structure of the pattern is represented repeatedly. Therefore, the term "periodic pattern" is also used instead of the term "pattern" in order to clearly express this property of the pattern. However, these two terms should have the same connotation below.

In an exemplary embodiment, the at least one symbol can be presented on the extent of the visual display unit in such a way that a direction in relation to the at least one symbol, for example an edge of the at least one symbol, can adopt a fixed angle in relation to an orientation of the visual display unit, the fixed angle typically being 0° or a multiple of 90°. In this case, the term "orientation" denotes a direction which is typically parallel to an edge of the visual display unit which usually adopts the shape of a rectangle. In this way the at least one symbol can be adapted to the extent of the visual display unit at present. However, other ways of presenting the at least one symbol on the visual display unit are conceivable, for example at a fixed angle in relation to the orientation of the visual display unit of 45° or an odd multiple thereof.

On account of an electronic control at least one parameter of the at least one symbol represented on the visual display unit can be varied easily and over a broad scope. The "parameter" is a property of the at least one symbol, depending on the selected symbol, in particular an extent, an orientation, a frequency, a contrast, or a color (including black and white). In the case of the at least one pattern a structure can be represented repeatedly, wherein similar points or regions can form over the structure of the at least one pattern as a result of repetition. Particular configurations of similar points or regions can typically be present as periodic maxima or minima of the at least one pattern. While the at least one selected parameter of at least one conventional optotype, in particular a letter, a number, or a symbol, can therefore be an extent of the at least one optotype, in particular a height or width, the at least one parameter in the case of the at least one periodic pattern typically relates to at least one parameter of at least one periodic function, in particular at least one repetition frequency. In this case, the "periodic function" denotes an instruction for a configuration of a temporally repeated, or typically spatially repeated, variation of the at least one pattern. The periodic function can typically be selected from a sine function, a cosine function, or a superposition thereof. However, other periodic functions are conceivable.

In a particularly typical configuration of the present disclosure, the at least one symbol represented on the visual display unit can carry out a movement across the visual display unit. In this case the movement of the at least one symbol represented on the visual display unit can be implemented in continuous fashion or in jumps. In this case the term "movement" denotes a change over time in the location on the visual display unit at which the at least one symbol is represented, independently of whether or not the at least one symbol represented on the visual display unit changes in view of its parameterization during a course of the movement. However, according to the disclosure it is particularly typical for at least one parameter of the at least one symbol represented on the visual display unit to be varied while the at least one symbol represented on the visual display unit carries out a movement across the visual display unit. It is irrelevant in this context that the movement of the at least one symbol across the visual display unit is only virtual. On account of the electronic actuation it is possible to vary the location of the representation of the at least one symbol on the visual display unit in such a simple manner that the variation can be implemented in a manner quicker than perceivable by the user, and so the user can assume that the at least one symbol actually carries out a movement across the visual display unit. As a rule, the user can recognize a continuous movement in this case if the location of the representation of the at least one symbol on the visual display unit changes correspondingly slowly. Then again, a fast or significant spatial variation in the location of the representation of the at least one symbol on the visual display unit may cause the user to assume that the at least one symbol jumps over the visual display unit.

In a typical configuration, the at least one symbol represented on the visual display unit can be at least one pattern, wherein the associated at least one parameter of the at least one pattern comprises at least a spatial frequency of the periodic pattern. In this case, the term "spatial frequency" denotes a reciprocal of a spatial distance between two adjacently arranged similar points, in particular a maximum or a minimum, in a spatially periodic change in the at least one pattern, and it can be specified in units of 1/m or, in particular if the distance of the visual display unit from the eye of the user is known, it can alternatively or additionally also be specified as a dimensionless number, for example per degree or per cycle. In this case the intensity or the color of the at least one pattern can typically follow the curve of the periodic function, in particular the sine function, along one direction of extent of the visual display unit. Other ways of determining the spatial frequency from the at least one pattern are conceivable however, for example from a spacing of points of equal intensity.

In this typical configuration, the at least one pattern or the at least one periodic pattern can be designed as a two-dimensional superposition of a periodic function, in particular the sine function, which can extend in a first direction along the extent of the visual display unit and a constant function which can extend in a second direction along the extent of the visual display unit, which second direction can typically be arranged to be perpendicular to the first direction. In this case the term "perpendicular" denotes an angle of 90°±30°, typically 90°±15°, particularly typically 90°±5°, in particular 90°±1°. However, other angles between the first direction and the second direction are likewise possible. In this way, the at least one pattern can be present in the form of stripes arranged next to one another in periodic fashion, which can also be referred to as the "sinusoidal grating" or "Gabor patch." The term "Gabor patches" refers to sinusoidal gratings which are typically provided with a Gaussian envelope and known to be usable in particular as a stimulus for at least one eye of the user. However, other types of patterns are possible.

According to step b) an eye movement metric of the at least one eye of the user is captured typically during the representation of the at least one symbol on the visual display unit as per step a) and on the basis of the at least one symbol which is represented on the visual display unit and serves as a stimulus for the at least one eye of the user. In this case the term "eye movement metric" denotes a measure linked to a movement of the at least one eye of the user, wherein the movement of the at least one eye of the user is caused by an external stimulus acting on the at least one eye of the user. Within the scope of the present disclosure the eye movement metric can typically relate to: a pursuit eye movement; an eye movement which relates to microsaccades and comprises a microsaccade direction, a microsaccade rate and/or a saccade accuracy; or an optokinetic nystagmus. Further eye movement metrics could for example include the dwell time when the at least one represented symbol is read fluently, which is also referred to as "fixation duration." Moreover, further types of eye movements can likewise be captured. What type of eye movement metric or what combination of at least two eye movement metrics is used to determine the value for the refractive error of at least one eye of the user, in particular to ascertain the contrast sensitivity at the spatial frequencies of the at least one pattern as described in more detail below, depends substantially on an accuracy of a video camera used to this end.

In this case, the term "pursuit eye movement" denotes a movement of at least one eye with which the at least one eye pursues the movements of the at least one symbol represented on the visual display unit and fixated on by the at least one eye. In general, the pursuit eye movement is a slow movement of the at least one eye with an angular speed of 0.5°/s to 50°/s, during which an image representation of the at least one symbol typically remains on the fovea of the at least one eye. The pursuit eye movements cannot be produced voluntarily but require the at least one symbol represented on the visual display unit to carry out a movement which the at least one eye of the user can pursue.

Within the scope of the present disclosure eye movement metrics based on saccades or microsaccades can typically be used as a measure of establishing whether or not the user has recognized the at least one symbol represented on the visual display unit as a stimulus. The term "saccade" denotes jerky visual target movements of at least one eye of the user which are carried out in target-related fashion, which have a small amplitude of at least 1° and which in particular serve the purpose of the fast regular realignment of a line of sight of the at least one eye on a fixation point, typically by virtue of the image representation of at least one symbol situated on the fixation point being displaced from a periphery to the fovea of the at least one eye. A "saccade rate" is typically 1 Hz to 5 Hz, wherein an angular speed of 5°/s to 500°/s can be achieved. The term "microsaccade" denotes small jerky and involuntary visual movements which may not be related to a target, which occur randomly and whose amplitude is less than 1°. The "microsaccade direction" relates to a spatial orientation of the microsaccade relative to a coordinate system, typically a coordinate system established by the visual display unit. In this case, the orientation relative to the at least one symbol represented on the visual display unit can serve as a measure of recognition. The "saccade accuracy" denotes a spatial precision of a realignment relative to a new position of a stimulus. If the perception of the stimulus following the realignment can be poorer, an expected error of the realignment is greater in this case.

As an alternative or in addition thereto, eye movement metrics which relate to the optokinetic nystagmus can typically be used as a measure of establishing whether or not the user has recognized the at least one symbol represented on the visual display unit as a stimulus. The term "optokinetic nystagmus" denotes a physiological eye movement reflex which is characterized by a slow and a quick phase. In this case, the slow phase corresponds to a pursuit movement at the speed of a moving stimulus in the surroundings. A correlation of the phase or the speed of the stimulus on the visual display unit with the slow phase of the optokinetic nystagmus can be used as a measure of whether a user recognizes the stimulus.

To capture the eye movement metrics in this case use can typically be made of a video camera, in particular in order to be able to carry out video-based "eye tracking." In this case, the term "video camera" denotes a camera which is configured to record image sequences of an eye area of the user. The eye area typically comprises at least one eye, particularly typically both eyes of the user. The at least one observed eye movement metric can be evaluated by means of image processing from the image sequences of the eye area recorded by the video camera, typically in an evaluation unit configured to this end. To this end, known algorithms in particular can be used in each case.

Moreover, image processing, likewise typically in the evaluation unit, can be used to ascertain further geometric data of the at least one eye, typically its pupil, in particular the position and diameter of the pupil, from the image sequences recorded by the video camera, and from this it is possible to determine the line of sight of the at least one eye, for example. Furthermore, it is possible to use methods which include selected reflection points that may arise on the front side and/or back side of the cornea and lens if the at least one eye is irradiated by a light source. In particular it is possible to determine a corneal reflection; see for example P. Blignaut, *Mapping the Pupil-Glint Vector to Gaze Coordinates in a Simple Video-Based Eye Tracker*, Journal of Eye Movement Research 7(1):4, pages 1-11, 1995. However, in principle, it is also possible to record other reflections, in particular by means of a so-called "dual Purkinje eye-tracker." Since the corneal reflection does not move without a head movement but the pupil changes its position during the eye movement, the rotation of the respective eye can be deduced therefrom. Here, the "pupil" denotes an entry opening that is present in each eye, through which radiation in the form of light can enter into the interior of the eye. In the opposite direction, the pupil can be regarded as an exit opening, through which the line of sight of the user from the eye to the surroundings can be defined.

The video camera can typically be contained in the same mobile communications device as the visual display unit. In particular, this can be a rear camera or typically a front camera of the mobile communications device. In this way it is possible to advantageously record the desired image sequence of the eye area of the user by means of the camera at any desired location. However, other types of cameras are conceivable, for example a camera which can be worn as a spectacles-like device and which is separate from the visual display unit. A disadvantage of this is that it is necessary to synchronize display and camera.

Furthermore, provision can be made of an illumination device, in particular in order to be able to capture the eye-movement metric of the user with the highest possible resolution and a high contrast by means of the video camera. As an alternative or in addition thereto, it is possible to resort to daylight or lighting already present.

In a particular configuration, the video camera can have a sensitivity in the infrared spectral range, i.e., at a wavelength of 780 nm to 1 mm, typically of 780 nm to 3 µm, in particular of 780 nm to 1.4 µm (according to the standard, section 4.4, also referred to as "IR-A"). In order to provide infrared radiation, for this purpose provision can be made of a light source which emits in the infrared spectral range, in particular at a wavelength for which the video camera has a sufficient sensitivity. The light source can typically be selected from a micro-incandescent lamp, a solid state-based IR emitter, a light-emitting diode or an infrared laser, wherein appropriate filters can be used.

According to step c), a point in time is established typically while step b) is carried out, which point in time is defined by virtue of a recognition threshold of the user for the at least one symbol represented on the visual display unit being evident at the established time from the observation of the eye movement metric of the user. To this end, step b) can be repeated for different values of the at least one parameter, typically until the desired point in time has been established by carrying out step c). In this case, the term "recognition threshold" denotes the fact that the user can only just still or only just perceive the at least one symbol represented on the visual display unit as a stimulus for at least one eye. If at least one of the parameters of the at least one symbol, in particular the spatial frequency in the periodic pattern, increasingly increases, it is possible in the process to establish the point in time at which the at least one symbol represented on the visual display unit just can no longer act as a stimulus for the at least one eye of the user. Conversely, if at least one of the parameters of the at least one symbol, in particular the spatial frequency in the periodic pattern, increasingly decreases, it is possible in the process to establish the point in time at which the at least one symbol represented on the visual display unit for the first time cannot act as a stimulus for the at least one eye of the user. Alternatively, it is also possible, for example if at least one of the parameters of the at least one symbol, in particular the spatial frequency in the periodic pattern, increasingly decreases, in the process to establish the point in time at which the at least one symbol represented on the visual display unit can just act as a stimulus for the at least one eye of the user. Conversely in this case, if at least one of the parameters of the at least one symbol, in particular the spatial frequency in the periodic pattern, increasingly increases, it is possible in the process to establish the point in time at which the at least one symbol represented on the visual display unit for the first time can act as a stimulus for the at least one eye of the user.

In a particularly typical configuration of the present disclosure the point in time at which the recognition threshold of the user for the at least one symbol represented on the visual display unit is evident from the reaction of the user can be established by virtue of the fact that the eye movement metric of the user only just still follows or only just starts to follow the movement of the at least one symbol represented on the visual display unit. In particular, the pursuit eye movement of the user with which they follow movements of at least one symbol which is fixated by the at least one eye can be used to this end to establish the desired point in time, in particular since, as mentioned above, the pursuit eye movements cannot be generated voluntarily but follow the movement of the at least one symbol which is represented on the visual display unit and which serves as a stimulus for the at least one eye of the user.

To this end it is typically the evaluation unit that establishes during step c) the desired point in time at which the recognition threshold of the user for the at least one symbol represented on the visual display unit, in particular the spatial frequency of the at least one pattern, is evident from the eye movement metric of the user.

To this end, data for capturing the eye movement of the user which were recorded by the video camera and transmitted to the evaluation unit can typically be used to ascertain the line of sight of the user to the at least one symbol represented on the visual display unit. In the case of an increasing reduction in at least one of the parameters of the at least one symbol, in particular in the spatial frequency in the periodic pattern, the pursuit eye movement of the user will correspond to the movement of the at least one symbol across the visual display unit for as long as the user can recognize the at least one symbol represented on the visual display unit. Once a point in time has been reached at which the user just can no longer recognize the at least one symbol, in particular the periodic pattern, represented on the visual display unit and said symbol can consequently no longer act as a stimulus for the at least one eye of the user, the pursuit eye movement of the user will deviate from the movement of the at least one symbol on the visual display unit. Conversely, if the point in time is reached at which the user for the first time can just recognize the at least one symbol, in particular the periodic pattern, represented on the visual display unit and said symbol can consequently for the first time act as a stimulus for the at least one eye of the user, the pursuit eye movement of the user will now start to follow the movement of the at least one symbol on the visual display unit. Independently of the type of configuration it is preferable in this context to be able to set a threshold by means of which a degree of deviation of the pursuit eye movement of the user from the movement of the at least one symbol on the visual display unit is established as a point in time as per step c). The point in time at which the deviation exceeds or drops below the defined threshold in this case represents the point in time sought after as per step c).

According to step d), a value for the refractive error of the at least one eye of the user is determined from the value of the at least one parameter used at the established time to set the selected at least one parameter of the at least one symbol on the visual display unit, this typically being implemented following the establishment of the point in time and typically being implemented in the evaluation unit. In the above-described typical configuration the value for the refractive error can be determined from the spatial frequency of the at least one pattern, which may also be a limit frequency of the pattern, established at the point in time, for which spatial frequency the recognition threshold of the user for the at least one symbol represented on the visual display unit is evident from the observation of the eye movement metric of the user during step c). The "limit frequency" denotes the spatial frequency of the at least one pattern at which the contrast sensitivity becomes zero or the contrast of the stimulus becomes maximal. This frequency can also be considered to be the resolution limit of the visual system.

In a particularly typical configuration of the present disclosure, a contrast sensitivity of at least one eye of the user can initially be ascertained from the parameter established at the point in time. In this case the term "contrast sensitivity" of the at least one eye defines a measure for distinguishing different shades of gray as the reciprocal of the smallest, just still perceivable difference between two grayscale values. The terms "visual acuity" and "visual discrimination" of the at least one eye of the user in each case specify a measure for a spatial distance between two points which the at least one eye of the user can still perceive as distinguishable. In the above-described typical configuration the contrast sensitivity can be ascertained by means of a periodic pattern in the form of stripes arranged periodically next to one another, said pattern also being referred to as "sinusoidal grating" or as "Gabor patch." In a typical representation it is possible to define a contrast sensitivity function to this end, in which the contrast sensitivity is plotted against the spatial frequency of the periodic pattern. This function in each case adopts a different curve for selected defocusing of the at least one eye of the user. By establishing which curve the contrast sensitivity of the at least one eye of the user has it is possible to determine the present defocusing of the at least one eye and the spherocylindrical configuration of the spectacle lens that leads to a far-reaching compensation of the refractive error of the at least one eye and hence to an image quality for the user that is as optimal as possible, and from this it is possible to establish the value for the refractive error of the at least one eye of the user. For further details in relation to the optical and neural components of the contrast sensitivity function, reference is made to A. Leube et al., *Individual neural transfer function affects the prediction of subjective depth of focus*, Scientific Reports 2018, 8(1), 1919, and for the corresponding determination of the value for the refractive error reference is made to the exemplary embodiments.

A refractive error of at least one eye of the user leads to defocusing and consequently to a reduction in the still optically resolvable parameters, for example at least one contrast of a spatial frequency of the represented at least one pattern. If the contrast sensitivity function of the at least one eye is now determined, this function is the product of an optical component, e.g., the physical modulation transfer function, and a neural component, e.g., the neural transfer function. A refractive error leads to at least one change in at least one parameter, typically the contrast of at least one spatial frequency, typically the limit frequency, which is able to be mathematically modeled for the respective refractive error. This change which is able to be mathematically modeled for the respective refractive error leads to the change in the contrast sensitivity function which is able to be mathematically modeled. Consequently, the influence of a refractive error on the still optically resolvable parameters is determined. According to the disclosure, the neural transfer function is typically assumed constant and a possible refractive error present is determined using knowledge of the contrast sensitivity function of the at least one eye and the mathematical modeling of the physical modulation transfer function.

In the present disclosure, refractive error is understood to mean suboptimal refraction of light in at least one eye, in the case of which the image plane of the eye of light rays coming from infinity is not located at the point of intersection of all light rays coming from infinity. In this case, as a spherocylindrical refractive error, the refractive error typically comprises a spherical deviation and a cylindrical deviation and its axis. The refractive error is determined for distance vision, typically analogous to DIN 58220-5:2013-09, section 5, table 1, for a test distance between the at least one symbol and the entry pupil of the eye of ≥4 m, with a maximum deviation of ±3%, and/or for near vision, typically for a test distance between the at least one symbol and the entry pupil of the eye of <4 m or further typically, analogous to DIN 58220-5:2013-09, section 5, table 1, for a test distance between the at least one symbol and the entry pupil of the eye of 0.400 m or of 0.333 m or of 0.250 m, in each case with a maximum deviation of ±5%. Furthermore, the refractive error can also be determined for intermediate vision, typically analogous to DIN 58220-5:2013-09, for a test distance between the at least one symbol and the entry pupil of the eye of 1.000 m or of 0.667 m or of 0.550 m, in each case with a maximum deviation of ±5%.

The method according to the disclosure for determining a refractive error of at least one eye can be used if the refractive error of the at least one eye of the user has been corrected, for example by means of at least one correction lens, i.e., pursuant to the standard, section 8.1.3, a spectacle lens with dioptric power. Should the refractive error of the at least one eye be corrected, the method according to the disclosure can be used for example to check whether a change in the refractive error is present. If a change in the refractive error is present, the method according to the disclosure can be used to determine the change in the refractive error.

The method according to the disclosure for determining a refractive error of at least one eye can furthermore be used if a possibly present refractive error of the at least one eye has not been corrected, for example by means of at least one correction lens. By means of the method according to the disclosure it is furthermore possible to establish whether a refractive error of the at least one eye is even present. In the case of a known refractive error, it is furthermore possible to ascertain the change in the refractive error without the known refractive error being corrected to this end, for example by means of a correction lens. The method according to the disclosure for determining the refractive error of at least one eye is typically applied when the at least one eye of the user has not been corrected.

In particular, from a determination of the refractive error occurring for the user, it is consequently possible to ascertain a spherocylindrical lens which is used as a spectacle lens to compensate the refractive error occurring as defocusing of the at least one eye, in such a way that an image quality that is as optimal as possible can be obtained for the user. Various modes of expression are suitable for describing the spherocylindrical lens. The standard defines in section 11.2 what is known as a "spherical power," which is defined as a value for a vertex power of a spectacle lens with spherical power or for the respective vertex power in one of two principal meridians of the spectacle lens with astigmatic power. According to the standard, 9.7.1 and 9.7.2, the "vertex power" is defined as the reciprocal of a paraxial back focal length of a rear focus, in each case measured in meters. The spherocylindrical spectacle lens with astigmatic power in accordance with the standard, section 12, combines a paraxial, parallel beam of light in two separate focal lines perpendicular to one another and therefore has a spherical vertex power only in the two principal meridians. In accordance with the standard, the "astigmatic power" is defined by cylinder power and axis position. In this case, the "cylinder strength" in accordance with the standard, 12.5, represents the absolute value of an "astigmatic difference," which indicates the difference between the vertex powers in the two principal meridians. In accordance with the standard, 12.6, the "axis position" denotes a direction of the principal meridian whose vertex power is used as a reference value. Finally, according to the standard, 12.8, the "strength" of the spectacle lens with astigmatic power is specified by means of three values, comprising the vertex powers of each of the two principal meridians and the cylinder strength.

According to L. N. Thibos, W. Wheeler and D. Homer (1997), *Power Vectors: An Application of Fourier Analysis to the Description and Statistical Analysis of Refractive Error*, Optometry and Vision Science 74 (6), pages 367-375, in order to describe an arbitrary spherocylindrical lens and/or the refractive error, it is suitable in each case to specify a "power vector" which can be described by exactly one point in a three-dimensional dioptric space, wherein the three-dimensional dioptric space can be spanned by coordinates which correspond to the mean spherical refractive power and the cylindrical strength, and the associated axis, or are correlated therewith.

In a typical configuration, the at least one symbol, in particular the at least one periodic pattern, can be represented initially in a first direction and subsequently in a second direction, which may be arranged perpendicular to the first direction. In this way, vertex power values for each of the two principal meridians, which are perpendicular to one another, can be ascertained successively for the spherocylindrical spectacle lens with astigmatic power.

Consequently it is possible to particularly advantageously dispense with a psychophysical algorithm for determining the refractive error of the at least one eye. In this case the term "psychophysical algorithm" denotes a procedure which is based on regular interactions between subjective psychic, mental experience of the user and quantitatively measurable, objective physical stimuli as the trigger for the experience of the user. Rather, according to the disclosure, a measurement variable in the form of a capture the eye-movement metric is used, from which it is possible to draw conclusions about the reaction of the user on the basis of at least one stationary or moving symbol, for example a spatial frequency varying over time.

In a further configuration, the individual steps of the method, listed above, for determining a refractive error of at least one eye of a user are carried out with the aid of at least one mobile communications device. Typically, at least one mobile communications device should be understood to mean an apparatus which comprises at least one programmable processor and at least one camera and at least one acceleration sensor, and which is typically designed to be carried, i.e., configured in respect of dimensions and weight so that a person is capable of carrying it along. Further components can be present in the at least one mobile communications device, for example at least one visual display unit, at least one light source for, e.g., visible light from a wavelength range of 380 nm to 780 nm and/or infrared light from a wavelength range of 780 nm to 1 mm and/or at least one light receiver with a sensitivity to, e.g., visible light from a wavelength range from 380 nm to 780 nm and/or infrared light from a wavelength range from >780 nm to 1 mm. Typical examples of such mobile communications devices, as already mentioned above, are smartphones or tablet PCs, which may comprise at least one visual display unit, for example a sensor visual display unit (touchscreen), at least one camera, at least one accelerometer, at least one light source, at least one light receiver and further components such as wireless interfaces for mobile radio and WLAN (wireless LAN). The representation of at least one symbol as per step a) of the method according to the disclosure can be implemented for example by means of the at least one visual display unit of the at least one mobile communications device. Capturing an eye movement metric of the at least one eye as per step b) of the method according to the disclosure can be implemented for example by means of the at least one camera or by means of the at least one light source and by means of the at least one camera, in each case of the at least one mobile communications device. Establishing a time at which a recognition threshold of the user for the at least one symbol represented on the visual display unit is evident from the eye movement metric of the at least one of the user as per step c) of the method according to the disclosure can be implemented for example by means of the at least one camera or by means of the at least one light source and by means of the at least one camera, in each case of the at least one mobile terminal. Furthermore, the at least one camera of the mobile communications device can comprise at least one autofocus system. The at least one camera can have a zoom objective with a variable viewing angle or at least two objectives with different viewing angles. If the at least one camera has at least one distance sensor it is possible to determine the distance between the visual display unit of the mobile communications device and the eye of the user, for example by means of the signal from the distance sensor. If the camera has at least two objectives which may have an identical viewing angle or different viewing angles and which are spatially separated from one another in the lateral direction, it is possible to determine the distance between the camera of the mobile communications device and the eye of the user by means of a triangulation method, for example. In the latter case the viewing angle of the at least two objectives is typically identical.

In a further aspect, the present disclosure relates to a computer program for determining a refractive error of at least one eye of a user, wherein the computer program is set up to determine the refractive error of the at least one eye of the user in accordance with the method, described herein, for determining a refractive error of at least one eye of a user.

In a further aspect, the present disclosure relates to a method for producing a spectacle lens, wherein the spectacle lens is produced by processing a lens blank (standard, section 8.4.1) or a spectacle lens semifinished product (standard, section 8.4.2), wherein the lens blank or the spectacle lens semifinished product is processed in each case on the basis of refraction data and optionally centration data, wherein the refraction data and optionally the centration data comprise instructions for compensating the refractive error of at least one eye of the user, wherein a determination of the refractive error of the at least one eye of the user is implemented in accordance with the method, described herein, for determining a refractive error of at least one eye of a user. The refraction data typically comprise the correction of the refractive error of the at least one eye of the user with respect to the spherical correction and the astigmatic correction with axis position, in each case for distance vision and/or for near vision. The centration data typically comprise at least

- the face form angle, the angle between the frame plane and the right or left lens plane, pursuant to the standard, section 17.3, and/or
- the coordinates of the centration point, i.e., the absolute value of the distance of the centration point from the nasal vertical side or from the lower horizontal side of the boxed system, measured in the lens plane, pursuant to the standard, section 17.4, and/or
- the corneal vertex distance, i.e., the distance between the back surface of the spectacle lens and the apex of the cornea measured in the viewing direction perpendicular to the frame plane, pursuant to the standard, section 5.27, and/or
- the "as-worn" pantoscopic angle or pantoscopic angle, i.e., the angle in the vertical plane between the normal with respect to the front surface of a spectacle lens at the center thereof according to the boxed system and the fixation line of the eye in the primary position, which is usually assumed as horizontal, pursuant to the standard, section 5.18, and/or
- optionally the far visual point, i.e., the assumed position of the visual point on a spectacle lens for distance vision under given conditions, pursuant to the standard, section 5.16, and/or
- optionally the near visual point, i.e., the assumed position of the visual point on a spectacle lens for near vision under given conditions, pursuant to the standard, section 5.17.

In a further aspect, the present disclosure relates to an apparatus for determining the refractive error of at least one eye of the user. According to the disclosure, the apparatus comprises

- a visual display unit which is configured to represent at least one symbol and at least one change of at least one parameter of the at least one symbol;
- a camera, typically a video camera, which is configured to capture an eye movement metric of the at least one eye of the user on the basis of the at least one symbol represented on the visual display unit; and an evaluation unit which is configured to establish a point in time at which a recognition threshold of the user for the at least one symbol represented on the visual display unit is evident from the eye movement metric of the at least one eye of the user, and to determine a value for the refractive error of the at least one eye of the user from the parameter defined at the point in time.

In one particularly typical configuration, the evaluation unit can furthermore have a device for capturing a distance between the at least one eye of the user and the visual display unit or the camera, for example a video camera. To this end, the pupil diameter of the at least one eye of the user can be ascertained from a determination of a pupil distance between the camera, for example a video camera, and the at least one eye of the user by way of image processing of, in particular, an image sequence of the eye area of the user which was recorded by the camera, for example the video camera, particularly if a calibration of the pixels of the camera is present in spatial units. In a typical configuration, provision can be made of at least two cameras which are arranged jointly in the form of a stereo camera and are therefore configured for capturing the distance between the at least one eye of the user and the visual display unit. Alternatively or additionally, the apparatus can comprise a distance measuring unit configured for determining the pupil distance between the camera, for example the video camera, and the at least one eye of the user.

For definitions and optional configurations of the computer program and of the apparatus for determining a refractive error of at least one eye of a user and also of the method for producing a spectacle lens, including the features cited therein, reference is made to the description above or below of the method for determining a refractive error of at least one eye of a user.

The apparatus according to the disclosure and the methods present can be used in particular when selecting at least one new spectacle lens for the user. As an alternative or in addition thereto, a use however is also possible when checking at least one already present spectacle lens of the user. In the latter case, the user can wear the spectacles when the method for determining the refractive error is carried out and can establish the deviations from an optimal refraction by the optical system comprising the eye and the at least one spectacle lens of the user. The value determined in the process for the at least one spectacle lens can additionally be used for the selection and production of further spectacles, which can serve, e.g., as duplicate spectacles or as spare spectacles.

The apparatus according to the disclosure and the present methods have numerous advantages over conventional apparatuses and methods. This can be used for an objective ascertainment of the correction of a refractive error of at least one eye of a user without specialist equipment, in particular without requiring subjective feedback from the user, for example in the form of a manual or acoustic input into the apparatus. The proposed apparatus is not restricted to one location and can in particular also be used by non-specialists in the process. Furthermore, the contrast sensitivity determined by capturing the eye movement metric is advantageously used for ascertaining the correction in order thus to easily determine the refractive error of the at least one eye of the user.

In summary, in the context of the present disclosure, the following clauses are particularly typical:

Clause 1. A method for determining a refractive error of at least one eye of a user, wherein the method comprises the following steps:
 a) representing at least one symbol on a visual display unit, wherein at least one parameter of the at least one symbol represented on the visual display unit is varied;
 b) capturing an eye movement metric of the at least one eye of the user on the basis of the at least one symbol represented on the visual display unit;
 c) establishing a point in time at which a recognition threshold of the user for the at least one symbol represented on the visual display unit is evident for the user from the eye movement metric of the at least one eye of the user; and
 d) determining a value for the refractive error of the at least one eye of the user from the parameter defined at the point in time.

Clause 2. The method according to the preceding clause, wherein the refractive error is determined for one eye of for both eyes of the user.

Clause 3. The method according to either of the preceding clauses, wherein the at least one parameter of the at least one symbol represented on the visual display unit is varied while the at least one symbol represented on the visual display unit carries out a movement across the visual display unit.

Clause 4. The method according to the preceding clause, wherein the movement of the at least one symbol represented on the visual display unit is implemented continuously or in jumps.

Clause 5. The method according to either of the two preceding clauses, wherein the point in time is established by virtue of the eye movement metric of the user just still following or only just following the movement of the at least one symbol represented on the visual display unit.

Clause 6. The method according to any one of the preceding clauses, wherein step b) is repeated for different values of the at least one parameter.

Clause 7. The method according to the preceding clause, wherein step b) is repeated for different values of the at least one parameter until the point in time as per step c) is established.

Clause 8. The method according to any one of the preceding clauses, wherein the eye movement metric relates to: a pursuit eye movement; an eye movement relating to microsaccades; or an optokinetic nystagmus.

Clause 9. The method according to the preceding clause, wherein the eye movement relating to microsaccades is selected from: a microsaccade direction or a microsaccade rate.

Clause 10. The method according to the preceding clause, wherein the eye movement metric relating to microsaccades is used as a measure for establishing whether or not the user has recognized the symbol as a stimulus.

Clause 11. The method according to the preceding clause, wherein the eye movement metric relating to saccades is selected from an accuracy of the carried-out saccade in relation to the spatial position of the stimulus on the visual display unit, which is used as a measure for establishing whether or not the user has recognized the at least one symbol as a stimulus.

Clause 12. The method according to the preceding clause, wherein the eye movement metric relating to the optokinetic nystagmus is selected from: a phase correspondence between the pursuit eye movement and the movement of the stimulus on the visual display unit, which is used as a measure for establishing whether or not the user has recognized the at least one symbol as a stimulus.

Clause 13. The method according to any one of the preceding clauses, wherein a value for contrast sensitivity of the at least one eye of the user is initially ascertained from the at least one parameter established at the point in time.

Clause 14. The method according to the preceding clause, wherein a contrast sensitivity function is established, which is fitted to the ascertained values of the contrast sensitivity of the at least one eye of the user.

Clause 15. The method according to the preceding clause, wherein a defocusing of the at least one eye of the user is ascertained from the established contrast sensitivity function.

Clause 16. The method according to the preceding clause, wherein the value for the refractive error of the at least one eye of the user is determined from the defocusing of the at least one eye of the user.

Clause 17. The method according to any one of the four preceding clauses, wherein the value for the refractive error of the at least one eye of the user is determined from the contrast sensitivity of the at least one eye of the user.

Clause 18. The method according to any one of the preceding clauses, when the at least one symbol is or comprises a periodic pattern.

Clause 19. The method according to the preceding clause, wherein the at least one parameter of the at least one pattern represented on the visual display unit is or comprises at least one spatial frequency.

Clause 20. The method according to any one of the preceding clauses, wherein the at least one symbol is initially represented in a first direction in relation to an orientation of the visual display unit and subsequently represented in a second direction which has been varied in relation to the first direction.

Clause 21. The method according to the preceding clause, wherein the vertex powers of each of the two principal meridians, which are perpendicular to one another, are successively ascertained for a spherocylindrical spectacle lens with astigmatic power.

Clause 22. The method according to any one of the preceding clauses, wherein a distance of the at least one eye of the user from the visual display unit is additionally captured.

Clause 23. The method according to the preceding clause, wherein the distance of the at least one eye of the user from the visual display unit is a pupil distance.

Clause 24. The method according to either of the two preceding clauses, wherein the distance is captured by means of a distance measuring unit.

Clause 25. The method according to any one of the three preceding clauses, wherein the distance is captured by means of the camera, for example a video camera.

Clause 26. The method according to any one of the four preceding clauses, wherein the distance is captured by means of at least two cameras configured jointly for capturing the distance.

Clause 27. The method according to the preceding clause, wherein the at least two cameras are arranged jointly in the form of a stereo camera.

Clause 28. The method according to any one of the preceding clauses, wherein the method is carried out while the user is wearing spectacles.

Clause 29. A computer program for determining a refractive error of at least one eye of a user, wherein the computer program is configured to carry out the steps according to any one of the preceding clauses.

Clause 30. A method for producing at least one spectacle lens, wherein the spectacle lens is produced by processing a lens blank or a spectacle lens semifinished product, wherein the lens blank or the spectacle lens semifinished product is processed in each case on the basis of refraction data and optionally centration data, wherein the refraction data and optionally the centration data comprise instructions for compensating the refractive error of the at least one eye of the user, wherein a determination of the refractive error of the at least one eye of the user is implemented in accordance with the steps according to any one of the preceding clauses relating to the method for determining a refractive error of at least one eye of a user.

Clause 31. An apparatus for determining the refractive error of at least one eye of the user, wherein the apparatus comprises:
    a visual display unit which is configured to represent at least one symbol and a change of at least one parameter of the at least one symbol;
    a camera, for example video camera, which is configured to capture an eye movement metric of the at least one eye of the user on the basis of the at least one symbol represented on the visual display unit; and
    an evaluation unit which is configured to establish a point in time at which a recognition threshold of the user for the at least one symbol represented on the visual display unit is evident from the eye movement metric of the at least one eye of the user, and to determine a value for the refractive error of the at least one eye of the user from the at least one parameter defined at the point in time.

Clause 32. The apparatus according to the preceding clause, wherein the apparatus furthermore comprises a distance measuring unit, wherein the distance measuring unit is furthermore configured to determine a distance between the apparatus and the at least one eye of the user.

Clause 33. The apparatus according to either of the two preceding clauses, wherein the camera, for example video camera, is configured to record an image of the at least one eye of the user, wherein the evaluation unit is furthermore configured to determine the distance between the apparatus and the at least one eye of the user by image processing of the image of the at least one eye of the user.

Clause 34. The apparatus according to any one of the three preceding clauses, wherein provision is made of at least two cameras configured jointly for capturing the distance between the apparatus and the at least one eye of the user.

Clause 35. The apparatus according to the preceding clause, wherein the at least two cameras are arranged jointly in the form of a stereo camera.

Clause 36. The apparatus according to any one of the five preceding clauses, wherein the apparatus is configured as a mobile communications device, wherein the mobile communications device comprises the visual display unit, the video camera, the evaluation unit and optionally the distance measuring unit.

Clause 37. The apparatus according to the preceding clause, wherein the mobile communications device is configured as a smartphone.

In a further aspect, the above-described method and/or the above-described apparatus and/or the above-described computer program can be used together with at least one further method and/or at least one further apparatus and/or a further computer program. Said at least one further method can be for example a method for determining a refractive error of a user's eye, typically a method in accordance with EP 3730036 A1, wherein said method comprises the following steps:

a) representing a character on a visual display unit, wherein a parameter of the character represented on the visual display unit is varied;
b) capturing a reaction of the user depending on the character represented on the visual display unit;
c) establishing a point in time at which a recognizability of the character represented on the visual display unit for the user is evident from the reaction of the user; and
d) determining a value for the refractive error of the user's eye from the parameter defined at the point in time, wherein the character represented on the visual display unit is a periodic pattern, wherein the parameter of the pattern represented on the visual display unit comprises at least one spatial frequency, and the value for the refractive error is determined from the spatial frequency of the pattern defined at the point in time.

As an alternative or in addition to the above-described method, the at least one further method can also be for example a method for determining at least one optical parameter of a spectacle lens, typically a method as per EP 3730998 A1, with this method comprising the following steps:

a) recording an image using a spectacle lens; and
b) ascertaining at least one optical parameter of the spectacle lens by means of image processing of the image, wherein the image comprises an eye area including the eyes and/or a facial area adjoining the eyes, of a user of the spectacle lens.

As an alternative or in addition to the methods described above, the at least one further method can for example also be a method for measuring the refractive power distribution of a left and/or a right spectacle lens in a spectacle frame, typically a method in accordance with EP 3730919 A1, in which, in a first step, at least one image capture device is used to capture at least one first imaging of a scene from at least one first recording position, wherein said at least one first imaging has at least two structure points and contains a left and/or a right spectacle lens in a spectacle frame with a section of the spectacle frame that defines a coordinate system of the spectacle frame, wherein the at least one imaging beam path for each of these at least two structure points in each case at least once passes and at least once does not pass through the first and/or the second spectacle lens of the spectacle frame. Each imaging beam path comprises the position of the structure point and also the chief ray incident in the at least one image capture device. A further step, which can temporally precede or succeed the first step, involves capturing at least one further imaging of the scene without the first and/or the second spectacle lens of the spectacle frame or without the spectacle frame containing the first and/or the second spectacle lens with the same at least two structure points of the first imaging of a scene by means of at least one image capture device from the first recording position or from at least one further recording position different than the first recording position. The at least one image capture device in the further step can be identical or different to the at least one image capture device from the first step. Typically, the at least one image capture device in the further step is identical to the at least one image capture device from the first step. Thereupon, in a calculation step, the coordinates of these at least two structure points are determined by means of image evaluation in a coordinate system, referenced to the coordinate system of the spectacle frame, of the image representation of this scene from the respective at least one beam path of these at least two structure points which has not passed the left and/or right spectacle lens in each case and the at least one further image representation of the scene. After this step, the refractive power distribution is determined in a step of determining a refractive power distribution for at least one section of the left spectacle lens in the coordinate system of the spectacle frame and/or in a step of determining a refractive power distribution for at least one section of the right spectacle lens in the coordinate system of the spectacle frame, in each case from the imaging beam paths which have passed through the respective spectacle lens.

As an alternative or in addition to the methods described above, the at least one further method can for example also be a method for measuring the refractive power distribution of a left and/or a right spectacle lens in a spectacle frame, typically a method in accordance with EP 3730919 A1, in which, in a first step, at least one image capture device is used to capture at least one first imaging of a scene from at least one first recording position, wherein said at least one first imaging has at least two structure points and contains a left and/or a right spectacle lens in a spectacle frame with a section of the spectacle frame that defines a coordinate system of the spectacle frame, wherein the at least one imaging beam path for each of these at least two structure points in each case at least once passes and at least once does not pass through the first and/or the second spectacle lens of the spectacle frame. Each imaging beam path comprises the position of the structure point and also the chief ray incident in the at least one image capture device. A further step, which can temporally precede or succeed the first step or be carried out simultaneously with the first step, involves capturing at least one further imaging of the scene with the left and/or the right spectacle lens in a spectacle frame and with a section of the spectacle frame defining a coordinate system of the spectacle frame by means of at least one image capture device from at least one further recording position different than the first recording position, with at least one imaging beam path for the same at least two structure points captured in the first imaging, wherein said at least one imaging beam path in each case at least once passes and at least once does not pass through the first and/or the second spectacle lens of the spectacle frame. That is followed by a further step which involves calculating the coordinates of the at least two structure points in a coordinate system—referenced to the coordinate system of the spectacle frame—of the scene from the respective at least one beam path of said at least two structure points which has respectively not passed through the left and/or right spectacle lens, and the at least one further imaging of the scene by means of image evaluation. Afterward, the refractive power distribution is calculated for at least one section of the left spectacle lens in the coordinate system of the spectacle frame and/or the refractive power distribution is determined for at least one section of the right spectacle lens in the coordinate system of the spectacle frame, in each case from the imaging beam paths which have passed through the respective spectacle lens.

Typically, in the two methods above for measuring the refractive power distribution of a left and/or a right spectacle lens, typically in a spectacle frame, a multiplicity of structure points are captured in the respectively first imaging of a scene from in each case at least one first recording position and the respectively succeeding steps are carried out on the basis of this respective multiplicity of structure points. A multiplicity of structure points is understood to mean typically at least 10, more typically at least 100, particularly typically at least 1000 and very particularly typically at least 10,000 structure points. In particular, a multiplicity of structure points is ≥100 structure points and ≤1000 structure points.

As an alternative or in addition to the methods described above, the at least one further method can for example also be a method for determining the refractive power distribution of a spectacle lens, typically a method in accordance with EP 3730918 A1, which for example makes possible a local refractive power from the size and/or shape comparison of the imaging of the front eye section for a specific viewing direction. This is done by carrying out at least one recording of the front eye section with and without a spectacle lens situated in front of the latter, and respectively comparing the recording with and without a spectacle lens with one another.

In a superordinate application, the various methods described above, i.e. the method according to the disclosure and also the at least one further method, can be combined in order, from a comparison of the results respectively obtained, for example, to obtain a higher accuracy or a plausibility check of the results obtained in the individual methods. The various methods described above can be effected successively or simultaneously in the superordinate application. If the various methods are effected successively, their order can be independent of one another and/or any desired order can be involved. If the various methods are effected successively, preference may be given to carrying out at least one of the above-described methods for determining the refractive power distribution last. A superordinate application can be for example a computer program comprising the various methods.

Further details and features of the disclosure will become apparent from the following description of exemplary embodiments. In this case, the respective features can be realized by themselves or as a plurality in combination with one another. The disclosure is not restricted to the exemplary embodiments. The exemplary embodiments are illustrated schematically in the figures. In this case, identical reference numerals in the individual figures designate identical or functionally identical elements or elements corresponding to one another with regard to their functions.

BRIEF DESCRIPTION OF THE DRAWINGS

The disclosure will now be described with reference to the drawings wherein.

DESCRIPTION OF EXEMPLARY EMBODIMENTS

Figure 1:
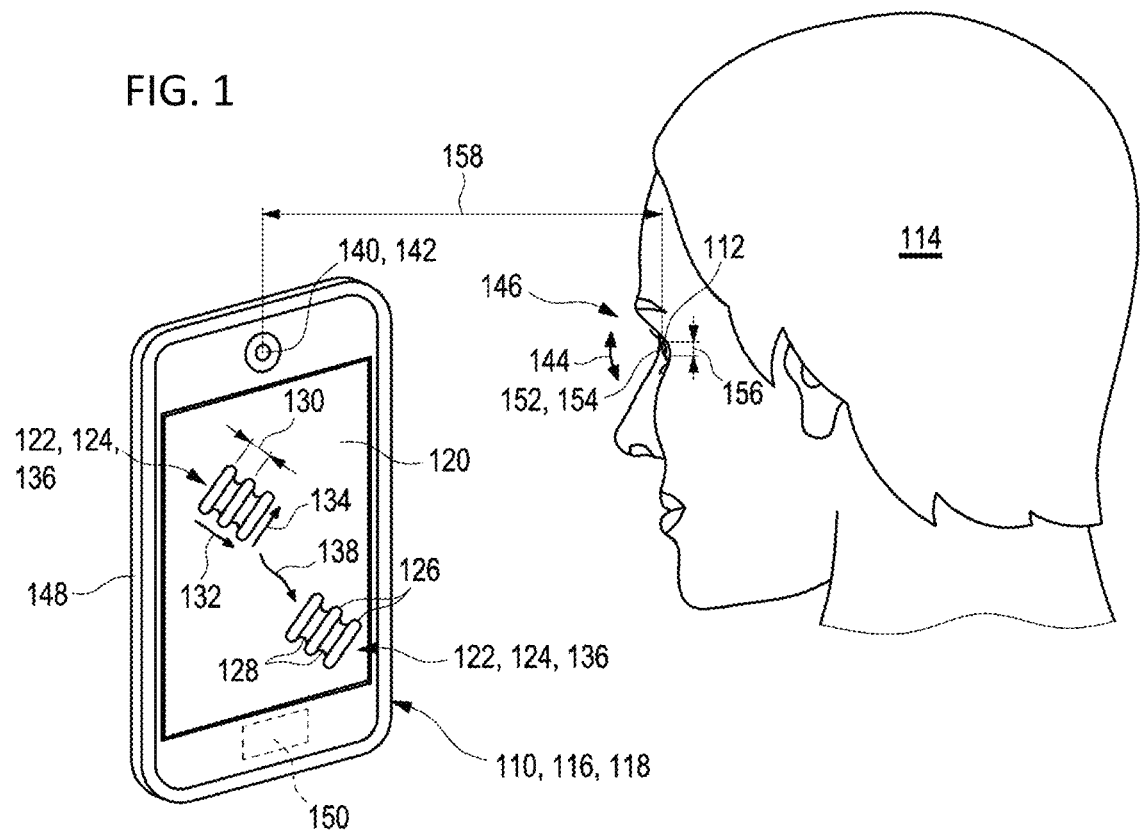
FIG. 1 shows an exemplary embodiment of an apparatus for determining a refractive error of an eye of a user.

FIG. 1 schematically shows an exemplary embodiment of an apparatus 110 for determining a refractive error of an eye 112 of a user 114. In this case, the apparatus 110 can be used to determine the refractive error of one eye 112 or of both eyes 112 of the user 114. In the illustration in accordance with FIG. 1 and in the following description—without loss of generality—the apparatus 110 proposed is embodied as a mobile communications device 116 in the form of a smartphone 118. An exemplary embodiment of the apparatus 110 in the form of some other mobile communications device 116, in particular as a cellular phone (cellphone) or tablet, is likewise conceivable, however.

The apparatus 110 comprises a visual display unit 120, which substantially adopts the shape of a rectangle in the illustration as per FIG. 1. However, other shapes of the visual display unit 120 are possible. The visual display unit 120 is configured to represent a symbol 122. In an exemplary embodiment of the present disclosure the symbol 122 represents a pattern 124 which comprises a graphical structure—in particular in contrast to noise which remains without identifiable structure—which has at least one spatially oriented period, within which the structure of the pattern 124 is represented repeatedly. The pattern is therefore also referred to as a periodic pattern.

Furthermore, the visual display unit 120 is configured to represent a change in a parameter of the symbol 122 represented on the visual display unit. On account of an electronic control of the visual display unit 120 on the smartphone 118, the selected parameter of the pattern 124 represented on the visual display unit can be varied easily and over a broad scope. In the periodic pattern 124 present here, the parameter can typically be linked to a property of a periodic function. In particular, a repetition frequency can be used in this case, with which the structure can be represented with such repetition that similar points or regions can form over the structure of the pattern 124 as a result of the repetition. In the illustration as per FIG. 1 periodic maxima 126 and minima 128 are identifiable as typical configurations of similar points or regions of the pattern 124. The periodic function used here is a sine function. However, other periodic functions are conceivable, for example a cosine function or a superposition of a cosine function with a sine function.

The parameter of the symbol represented as per FIG. 1 on the visual display unit 120 includes at least one spatial frequency of the periodic pattern 124, wherein the term spatial frequency denotes a reciprocal of a spatial distance 130 between adjacently arranged similar points, in particular between adjacent maxima 126 or between adjacent minima 128, in a spatially periodic change of the pattern 124. Other ways of determining the spatial frequency from the pattern 124 are conceivable however, for example from a spacing of points of equal intensity.

As FIG. 1 furthermore shows, the periodic pattern in this particular exemplary embodiment comprises a two-dimensional superposition of the periodic function, in particular the sine function, which extends in a first direction 132 along the extent of the visual display unit 120 and a constant function which extends in a second direction 134 along the extent of the visual display unit 120, which is arranged perpendicular to the first direction 132 in this case. However, other angles between the first direction 132 and the second direction 134 are likewise possible. In this way, the pattern 124 on the visual display unit 120 can be present in the form of stripes 136 arranged next to one another in periodic fashion, which are also referred to as the "sinusoidal grating" or "Gabor patch." However, other types of patterns 124 are likewise possible. The user 114 consequently observes the sinusoidal grating on the visual display unit from a defined distance, the sinusoidal grating comprising the stripes 136 with a high contrast and a multiplicity of spatial frequencies periodically arranged next to one another. A value ranging from 25 cm to 1 m, particularly typically from 40 cm to 75 cm, in particular a value of 50 cm, can typically be chosen for the distance.

In the exemplary embodiment of the present disclosure illustrated in FIG. 1, the spatial frequency of the pattern 124 represented on the visual display unit 120 is varied, in particular while the pattern 122 represented on the visual display unit 120 carries out a movement 138 across the visual display unit 120. In this case, the movement 138 of the pattern 124 represented on the visual display unit 120 can be continuous. Alternatively, the movement 138 of the pattern 124 can also be implemented in the form of jumps across the extent of the visual display unit 120. The change in the spatial frequency of the pattern 124 represented on the visual display unit 120 can be implemented, in particular, by virtue of a high spatial frequency being represented at the outset and the latter then being incrementally reduced, or by virtue of a low spatial frequency being represented at the outset and the latter then being incrementally increased. According to the disclosure, the value for the spatial frequency is set independently of the user 114.

The apparatus 110 furthermore comprises a video camera 140 which is configured to capture an eye movement metric 144 of the user 114 on the basis of the pattern 124 represented on the visual display unit 120. As illustrated schematically in FIG. 1, the video camera 140 can typically be a front camera 142 of the smartphone 118. Other configurations are possible, however. An image of an eye area 146 of the user 114 can be recorded by means of the video camera 140, in particular while the user 114 observes the sinusoidal grating on the visual display unit 120 of the smartphone 118. If one of the parameters of the symbol 122 varies, in particular the spatial frequency in the periodic pattern 124, it is possible in the process to establish a point in time at which the symbol 122 represented on the visual display unit 120 can no longer act as a stimulus for the eye 112 of the user 114. Conversely, if one of the parameters of the symbol 122 varies, in particular the spatial frequency in the periodic pattern 124, it is possible in the process to establish the point in time at which the symbol 122 represented on the visual display unit can for the first time act as a stimulus for the eye 112 of the user 114.

In the particularly typical configuration illustrated in FIG. 1, the point in time at which it is evident from the eye movement metric 144 of the user 114 that a recognition threshold for the symbol 122 represented on the visual display unit 120 is present, which should be understood to mean that the user 114 can just still or only just perceive the symbol 122 represented on the visual display unit 120, can be established by virtue of the eye movement metric 144 of the user 114 only just still following or only just starting to follow the movement 138 of the symbol 122 represented on the visual display unit 120. As already mentioned above, the eye movement metric 144 represents a measure linked to a movement of the eye 112 of the user 114, wherein the movement of the eye 112 of the user 114 is caused by the movement 138 and the change in the pattern 124 represented on the visual display unit 120 as external stimulus acting on the eye 112 of the user 114. The eye movement metric 144 recorded by the video camera 140 can be in particular a change in a pursuit eye movement, a microsaccade direction, a microsaccade rate, a saccade accuracy, or an optokinetic nystagmus, which occurs as a consequence of a change in the stimulus.

As furthermore illustrated schematically in FIG. 1, the apparatus 110 can further have a housing 148, which may comprise an evaluation unit 150. As an alternative or in addition thereto, the evaluation unit 150 may, however, also be attached outside of the housing 148, wherein a wired or wireless connection (not illustrated) may be provided between the video camera 140 and the evaluation unit 150. However, further types of the implementation are possible.

According to the disclosure, the evaluation unit 150 is configured to establish a point in time at which a recognition threshold of the user 114 for the symbol 122 represented on the visual display unit 120 is evident from the eye movement metric 144 of the user 114, in particular that the user 114 can only just still or only just recognize a parameter of the symbol 122 represented on the visual display unit 120, in particular the spatial frequency of the periodic pattern 124. To this end, the spatial frequency in the periodic pattern 124 can increase or decrease in time and/or in space, in particular in the first direction 132, typically during the movement 138 of the pattern. At the same time the video camera 140 is used to ascertain the eye movement metric 144 of the user 114.

In an exemplary embodiment, data for capturing the eye movement metric 144 of the user 114 which were recorded by the video camera 140 and transmitted to the evaluation unit 150 can typically be used to this end to ascertain the relevant eye movement metric 144 of the user 114 in relation to the symbol 122 represented on the visual display unit 120. In the case of a change in one of the parameters of a symbol 122 recognizable by the user 114, in particular in the spatial frequency in the periodic pattern 124, the pursuit eye movement of the user 114 will correspond to the movement 138 of the symbol 122 across the visual display unit 120 for as long as the user 114 can recognize the symbol 122 represented on the visual display unit 120. If the point in time is reached at which the user 144 just can no longer recognize the symbol 122, in particular the periodic pattern 124, represented on the visual display unit 120 and said symbol can consequently no longer act as a stimulus for the eye 112 of the user 114, the pursuit eye movement of the user 114 will deviate from the movement 138 of the symbol 122 on the visual display unit 120. Conversely, if the point in time is reached at which the user 114 can just for the first time recognize the symbol 122, in particular the periodic pattern 124, represented on the visual display unit 120 and said symbol can consequently act as a stimulus for the eye 112 of the user 114 for the first time, the pursuit eye movement of the user 114 will now start to follow the movement 138 of the symbol 122 on the visual display unit 120.

In an exemplary embodiment the evaluation unit 150 can typically define a threshold in the process, by means of which a degree of the deviation of the pursuit eye movement of the user 114 from the movement 138 of the symbol 122 on the visual display unit 120 is established as the sought-after point in time. However, other ways of establishing the sought-after point in time are conceivable.

Consequently, the desired image of the eye area 146 of the user 114 can be recorded by means of the video camera 140 at any desired location. Geometric data of the pupil 152, in particular a relative position 154 and a diameter 156 of the pupil 152 in the eye 112 of the user 114, can be ascertained from the recorded image sequence, in particular by means of image processing which can typically be carried out by the evaluation unit 150. As an alternative or in addition thereto, it is also possible to determine what is known as a "white-to-white distance" in the eye 112 of the user 114, for which standardized data are available.

According to the disclosure the evaluation unit 150 is furthermore configured to determine a value for the refractive error of the eye 112 of the user 114 from a specification of the point in time at which the recognition threshold of the user 114 for the symbol 122 represented on the visual display unit 120 is evident from the eye movement metric 144 of the user 114. To this end, the data regarding the capture of the pursuit eye movement of the user 114 recorded by the video camera 140 are transmitted to the evaluation unit 150, the latter being configured to determine the desired point in time therefrom. Furthermore, on account of the electronic control of the visual display unit 120 on the smartphone 118, the parameters of the symbol 122 represented on the visual display unit 120, in particular the spatial frequency of the periodic pattern 124, are known and can consequently be used by the evaluation unit 150 for the desired evaluation. To this end, the evaluation unit 150 in a particular exemplary embodiment can furthermore be configured to set the desired parameter of the symbol 122, in particular the spatial frequency of the periodic pattern 124, by controlling the visual display unit 120.

In a further exemplary embodiment it is possible to additionally ascertain a distance, referred to as pupil distance 158, between the video camera 140 and the eye 112 of the user 114. A distance measurement can be performed to determine the pupil distance 158, typically a distance measurement already available in the smartphone 118. As an alternative or in addition thereto, the pupil distance 158 can be determined by triangulation by way of a known number of pixels of the video camera 140 when a known object or image content is detected by the video camera 140. In particular, the pupil distance 158 can be used to be able to ascertain a distance in the symbol 122 more accurately, in particular the aforementioned spatial distance 130 between adjacently arranged similar points, in particular between the adjacent maxima 126 or between the adjacent minima 128, said spatial distance corresponding to the reciprocal of the spatial frequency in the periodic pattern 124.

In a particular exemplary embodiment of the present disclosure it is possible to initially ascertain a contrast sensitivity E of the eye 112 of the user 114 from the parameter of the symbol 122 established at the point in time, in particular the spatial frequency of the periodic pattern 124. As already mentioned above the contrast sensitivity E in this case specifies a measure for a distance which the eye 112 of the user 114 can still perceive as distinguishable, in particular the aforementioned spatial distance 130 between adjacently arranged similar points, in particular between the adjacent maxima 126 or between the adjacent minima 128, said distance corresponding to the reciprocal of the spatial frequency in the periodic pattern 124.

Figure 2:
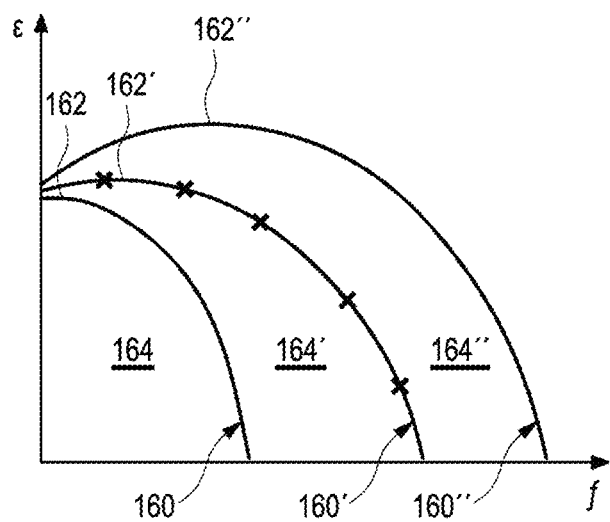
FIG. 2 shows a schematic representation in which a contrast sensitivity ε of the eye of the user is plotted against a spatial frequency f of a periodic pattern.

FIG. 2 shows a schematic illustration in which the contrast sensitivity E of the eye 110 of the user 114 as ascertained in accordance with the present method is plotted against the spatial frequency $f$ of the periodic pattern 124. As indicated schematically in FIG. 2 by the symbols "x" for the respective measurement values, the contrast sensitivity E of the eye 112 of the user 114 can be ascertained for different spatial frequencies $f$ in this case. According to the disclosure it is proposed to fit a selected contrast sensitivity function 160, 160', 160" to the respective measurement values to the best possible extent.

The curve of the contrast sensitivity function 160, 160', 160" is known and has a bell-shaped curve, which usually attains a maximum at a spatial frequency of 5 to 6 periods per degree. The contrast sensitivity function 160, 160', 160" drops off steeply towards higher spatial frequencies $f$ while a likewise observable drop to lower spatial frequencies $f$ has a less steep form. A respective maximum 162, 162', 162" of the contrast sensitivity function 160, 160', 160" represents the greatest possible visual discrimination of the eye 112 of the user 114. Furthermore, an area 164, 164', 164" below the contrast sensitivity function 160, 160', 160" can be considered to be the visible region, meaning that the user 114 can only recognize those objects that have a contrast and a structure located within the respective area 164, 164', 164."

It is evident from FIG. 2 that each of the contrast sensitivity functions 160, 160', 160" represented there has a respective different curve, wherein each of the contrast sensitivity functions 160, 160', 160" comprises a selected defocusing of the eye 112 as a parameter. Consequently, exactly one of the contrast sensitivity functions 160, 160', 160" can be fitted to the captured measurement values "x" to the best possible extent since the eye 112 has exactly one value for the defocusing. Consequently, the associated defocusing of the eye 112 of the user 114 can be ascertained from the parameter of the contrast sensitivity functions 160' with the best fit. From the defocusing of the eye 112 of the user 114 ascertained thus it is possible to establish the spherocylindrical configuration of the spectacle lens that leads to a far-reaching compensation of the refractive error of the eye 112 and hence to an image quality for the user 114 that is as ideal as possible. Consequently, the value for the refractive error of the eye 112 of the user 114 can ultimately be determined from that contrast sensitivity function 160' of the eye 112 of the user 114 which can be fit to the measurement values for the contrast sensitivity E of the eye 112 of the user 114 to the best possible extent for different spatial frequencies/However, other ways of capturing and evaluating measurement values are conceivable.

Figure 4:
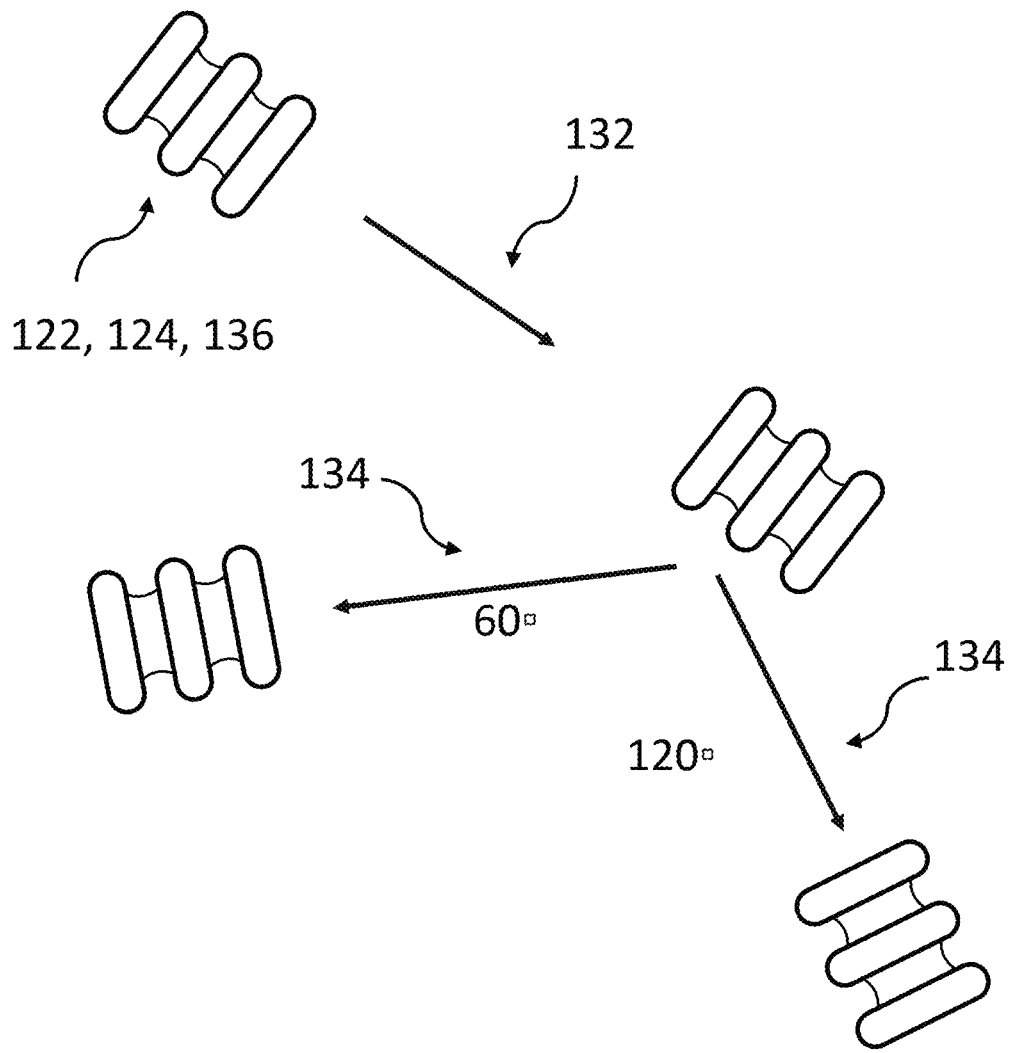
FIG. 4 shows a periodic pattern being initially represented in a first direction and subsequently in a second direction.

In a particular exemplary embodiment the defocusing can be determined in at least two meridians. To this end, the periodic pattern 124 as per FIG. 1 can typically be represented on the visual display unit 120, initially along the first direction 132 and, following this, (as shown in FIG. 4) along the second direction 134 which is typically arranged perpendicular to the first direction 132 on the visual display unit 120. In this way, vertex power values for each of the two principal meridians, which are perpendicular to one another, can be ascertained successively for a spherocylindrical spectacle lens with astigmatic power. For details in this respect reference is made to WO 2018/077690 A1.

Figure 3:
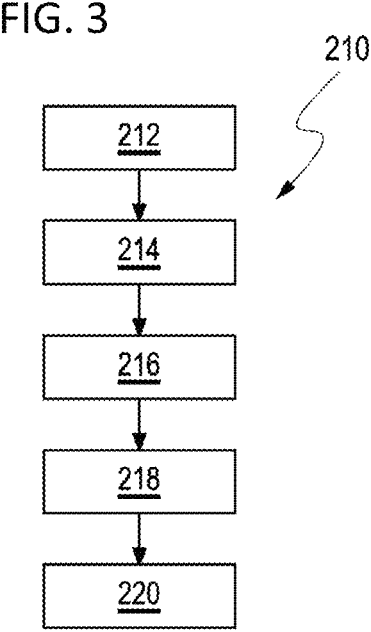
FIG. 3 shows a flowchart of an exemplary embodiment of a method according to the disclosure for producing at least one spectacle lens.

FIG. 3 schematically shows a flowchart of a typical exemplary embodiment of a method 210 according to the disclosure for determining the refractive error of the eye 112 of the user 114.

In a representation step 212 there is to this end, as per step a), the representation of the symbol 122 on the visual display unit 120, wherein a parameter of the symbol 122 represented on the visual display unit 120 is varied.

In a capture step 214 there is, as per step b), the capture of the eye movement metric 144 of the eye 112 of the user 114 on the basis of the symbol 122 represented on the visual display unit 120 in accordance with the representation step 212.

In an establishment step 216 there is, as per step c), the establishment of the point in time at which a recognition threshold of the user 114 for the symbol 122 represented on the visual display unit 120 is evident from the eye movement metric of the eye 112 of the user 114 in the capture step 214, such that the user 114 can just still or only just recognize the symbol 122 represented on the visual display unit 120 as per the representation step 212.

In a determination step 218 there is, as per step d), the determination of a value 220 for the refractive error of the eye 112 of the user 114 from the parameter defined for representing the symbol 122 on the visual display unit 120 in the representation step 212 at the point in time ascertained in the establishment step 216.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

110 Apparatus
112 Eye
114 User
116 Mobile communications device
118 Smartphone
120 Visual display unit
122 Symbol
124 Pattern
126 Maximum
128 Minimum
130 Spatial distance
132 First direction
134 Second direction
136 Stripes
138 Movement
140 Video camera
142 Front camera
144 Eye movement metric
146 Eye area
148 Housing
150 Evaluation unit
152 Pupil
154 Relative position of the pupil
156 Pupil diameter
158 Distance (pupil distance)
160, 160' . . . Contrast sensitivity function
162, 162' . . . Maxima
164, 164' . . . Area
210 Method for determining a refractive error of an eye of a user
212 Representation step
214 Capture step
216 Establishment step
218 Determination step
220 Value for the refractive error of the eye of the user

The invention claimed is:

1. A method for determining a refractive error of one or both eyes of a user, the method comprising:
representing at least one symbol on a visual display unit, wherein at least one parameter of the at least one symbol represented on the visual display unit is varied, and wherein a change in the at least one parameter is represented on the visual display unit;
capturing, with a video camera, an eye movement metric of the one or the two eyes of the user based on the at least one symbol represented on the visual display unit while the at least one parameter is varying;
establishing, with an evaluation unit, a point in time at which a recognition threshold of the user for the at least one symbol represented on the visual display unit is evident from the eye movement metric of the one or the two eyes of the user; and
determining a value for the refractive error of the one or the two eyes of the user from the established point in time with the evaluation unit,
wherein the at least one parameter of the at least one symbol represented on the visual display unit is varied while the at least one symbol represented on the visual display unit carries out a movement across the visual display unit,
wherein the movement includes a change over time in a location on the visual display unit on which the at least one symbol is represented initially in a first direction and subsequently in a second direction, the second direction being arranged at an angle in a range from 60° to 120° to the first direction, to ascertain an astigmatic power of the one or both eyes of the user, and
wherein the recognition threshold is established as a threshold of a degree of deviation of a pursuit eye movement from the movement of the at least one symbol.

2. The method as claimed in claim 1, wherein the movement of the at least one symbol represented on the visual display unit is implemented continuously or in jumps.

3. The method as claimed in claim 1, wherein the point in time is established by virtue of the eye movement metric of the user following the movement of the at least one symbol represented on the visual display unit at the recognition threshold.

4. The method as claimed in claim 1, further comprising:
ascertaining a contrast sensitivity of the one or the two eyes of the user from the at least one parameter established at the point in time; and
determining the value for the refractive error of the one or the two eyes of the user from the ascertained contrast sensitivity of the one or the two eyes of the user.

5. The method as claimed in claim 4, further comprising:
fitting a contrast sensitivity function to ascertained values of the contrast sensitivity of the one or the two eyes of the user;
ascertaining a defocusing of the one or the two eyes of the user from the fitted contrast sensitivity function; and
determining the value for the refractive error of the one or the two eyes of the user from the defocusing of the one or the two eyes of the user.

6. The method as claimed in claim 1, wherein the at least one symbol is or includes at least one periodic pattern, and wherein the at least one parameter of the at least one periodic pattern represented on the visual display unit is or includes at least one spatial frequency.

7. The method as claimed in claim 1, further comprising capturing a distance of the one or the two eyes of the user from the visual display unit.

8. The method as claimed in claim 1, wherein the method is carried out while the user is wearing a pair of spectacles.

9. A computer program for determining a refractive error of one or both eyes of a user, the computer program being stored on a non-transitory storage medium and being configured to cause a computer to:
  represent at least one symbol on a visual display unit, wherein at least one parameter of the at least one symbol represented on the visual display unit is varied, and wherein a change in the at least one parameter is represented on the visual display unit;
  capture, with a video camera, an eye movement metric of the one or the two eyes of the user based on the at least one symbol represented on the visual display unit while the at least one parameter is varying;
  establish, with an evaluation unit, a point in time at which a recognition threshold of the user for the at least one symbol represented on the visual display unit is evident from the eye movement metric of the one or the two eyes of the user; and
  determine a value for the refractive error of the one or the two eyes of the user from the established point in time with the evaluation unit,
  wherein the at least one parameter of the at least one symbol represented on the visual display unit is varied while the at least one symbol represented on the visual display unit carries out a movement across the visual display unit,
  wherein the movement includes a change over time in a location on the visual display unit on which the at least one symbol is represented initially in a first direction and subsequently in a second direction, the second direction being arranged at an angle in a range from 60° to 120° to the first direction, to ascertain an astigmatic power of the one or both eyes of the user, and
  wherein the recognition threshold is established as a threshold of a degree of deviation of a pursuit eye movement from the movement of the at least one symbol.

10. A method for producing a spectacle lens, which is implemented by processing a lens blank or a spectacle lens semifinished product, wherein the lens blank or the spectacle lens semifinished product is processed based on refraction data and, optionally, centration data, wherein the refraction data and optionally the centration data contain instructions for compensating a refractive error of one or both eyes of the user, and wherein the production of the spectacle lens includes a determination of the refractive error of the one or the two eyes of the user, the method comprising:
  representing at least one symbol on a visual display unit, wherein at least one parameter of the at least one symbol represented on the visual display unit is varied, and wherein a change in the at least one parameter is represented on the visual display unit;
  capturing, with a video camera, an eye movement metric of the one or the two eyes of the user based on the at least one symbol represented on the visual display unit while the at least one parameter is varying;
  establishing, with an evaluation unit, a point in time at which a recognition threshold of the user for the at least one symbol represented on the visual display unit is evident from the eye movement metric of the one or the two eyes of the user; and
  determining a value for the refractive error of the one or the two eyes of the user from the established point in time with the evaluation unit,
  wherein the at least one parameter of the at least one symbol represented on the visual display unit is varied while the at least one symbol represented on the visual display unit carries out a movement across the visual display unit,
  wherein the movement includes a change over time in a location on the visual display unit on which the at least one symbol is represented initially in a first direction and subsequently in a second direction, the second direction being arranged at an angle in a range from 60° to 120° to the first direction, to ascertain an astigmatic power of the one or both eyes of the user, and
  wherein the recognition threshold is established as a threshold of a degree of deviation of a pursuit eye movement from the movement of the at least one symbol.

11. An apparatus for determining a refractive error of one or both eyes of a user, the apparatus comprising:
  a visual display unit configured to represent at least one symbol and a change of at least one parameter of the at least one symbol;
  at least one video camera configured to capture an eye movement metric of the one or the two eyes of the user based on the at least one symbol represented on the visual display unit while the at least one parameter is varied; and
  an evaluation unit configured to establish a point in time at which a recognition threshold of the user for the at least one symbol represented on the visual display unit is evident from the eye movement metric of the one or the two eyes of the user,
  wherein the evaluation unit is further configured to determine a value for the refractive error of the one or the two eyes of the user from the established point in time,
  wherein the at least one parameter of the at least one symbol represented on the visual display unit is varied while the at least one symbol represented on the visual display unit carries out a movement across the visual display unit,
  wherein the movement includes a change over time in a location on the visual display unit on which the at least one symbol is represented initially in a first direction and subsequently in a second direction, the second direction being arranged at an angle in a range from 60° to 120° to the first direction, to ascertain an astigmatic power of the one or both eyes of the user, and
  wherein the recognition threshold is established as a threshold of a degree of deviation of a pursuit eye movement from the movement of the at least one symbol.

12. The apparatus as claimed in claim 11, further comprising:
  a device for capturing a distance of the one or the two eyes of the user from the visual display unit.

13. The apparatus as claimed in claim 11, further comprising:
  a light source which emits light in the infrared spectral range, wherein the video camera is sensitive to infrared light.

* * * * *